(12) United States Patent
Yu et al.

(10) Patent No.: US 9,934,586 B2
(45) Date of Patent: Apr. 3, 2018

(54) SYSTEM AND METHOD FOR PROCESSING MULTIMODAL IMAGES

(71) Applicant: SONY CORPORATION, Tokyo (JP)

(72) Inventors: Liangyin Yu, Fremont, CA (US); Ming-Chang Liu, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 15/017,021

(22) Filed: Feb. 5, 2016

(65) Prior Publication Data

US 2017/0228896 A1    Aug. 10, 2017

(51) Int. Cl.
   *G06K 9/00*     (2006.01)
   *G06T 7/33*     (2017.01)
   *G06T 7/12*     (2017.01)
   *G06T 7/149*    (2017.01)

(52) U.S. Cl.
   CPC .............. *G06T 7/337* (2017.01); *G06T 7/12* (2017.01); *G06T 7/149* (2017.01); *G06T 2207/10084* (2013.01); *G06T 2207/20036* (2013.01)

(58) Field of Classification Search
   USPC ............... 382/128, 106, 152, 154, 173, 181; 345/419, 581, 606; 356/601, 607, 237.1, 356/237.2; 340/435; 700/175, 195; 701/408, 426; 702/167
   See application file for complete search history.

(56) References Cited

U.S. PATENT DOCUMENTS

| 6,775,399 | B1 * | 8/2004 | Jiang ..................... G06T 5/30 382/128 |
| 7,394,530 | B2 * | 7/2008 | Budd ................. G01N 21/8851 356/237.1 |
| 7,466,848 | B2 * | 12/2008 | Metaxas ................ A61B 5/055 382/128 |
| 8,463,021 | B2 * | 6/2013 | Pal .......................... G06T 17/00 382/154 |
| 2009/0171627 | A1 | 7/2009 | Olson |
| 2014/0128881 | A1 | 5/2014 | Tyc et al. |

FOREIGN PATENT DOCUMENTS

CN    1299642 C    2/2007

OTHER PUBLICATIONS

Frederik Maes et al, "Multi-Modality Image Registration by Maximization of Mutual Information", IEEE Transactions on Medical Imaging, Apr. 1997, pp. 12, vol. 16, Issue: 2, ISSN: 0278-0062.

(Continued)

*Primary Examiner* — Anh H Do
(74) *Attorney, Agent, or Firm* — Chip Law Group

(57) ABSTRACT

Various aspects of a system and a method to process multimodal images are disclosed herein. In accordance with an embodiment, the system includes an image-processing device that generates a structured point cloud, which represents edge points of an anatomical portion. The structured point cloud is generated based on shrink-wrapping of an unstructured point cloud to a boundary of the anatomical portion. Diffusion filtering is performed to dilate edge points that correspond to the structured point cloud to mutually connect the edge points on the structured point cloud. A mask is created for the anatomical portion based on the diffusion filtering.

21 Claims, 9 Drawing Sheets

(56) References Cited

OTHER PUBLICATIONS

Jyoti Agarwal et al, "Implementation of Hybrid Image Fusion Technique for Feature Enhancement in Medical Diagnosis", Human-Centric Computing and Information Sciences, Feb. 4, 2015, pp. 17, vol. 5, Issue:3, India.
International Search Report and Written Opinion of PCT Application No. PCT/US17/15315, dated Apr. 17, 2017, 8 pages.

* cited by examiner

SYSTEM AND METHOD FOR PROCESSING MULTIMODAL IMAGES

REFERENCE

None.

FIELD

Various embodiments of the disclosure relate to processing of multimodal images. More specifically, various embodiments of the disclosure relate to processing of multimodal images associated with an anatomical portion of a subject.

BACKGROUND

Advancements in the field of medical imaging techniques and associated sensors or devices have made possible to visualize the interior of a body for clinical analysis and medical purposes. Different modalities, such a Computerized Tomography (CT) scanner and Magnetic Resonance Imaging (MRI) machines, provide different types of medical images for an anatomical portion-of-interest. Such different types of images are referred to as multimodal images. Multimodal images of the same anatomical portion, such as a skull portion, of the same subject may provide different visual representations and varied information depending on the modality used. It may be difficult to register such multimodal images because of different characteristics, such as structural, resolution, and/or clinical usage differences of the different imaging sensors. The multimodal images also have at least some common information content, which if located and computed accurately, registration may be achieved even for the multimodal images obtained from different sensors. Thus, an advanced technique and/or system may be required to process such multimodal images to generate enhanced visualization of one or more anatomical portions of a particular subject with improved accuracy. Such enhanced visualization may be employed by users, such as a physician, for diagnostic purposes and/or for provision of assistance in surgery.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system are provided to process multimodal images substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
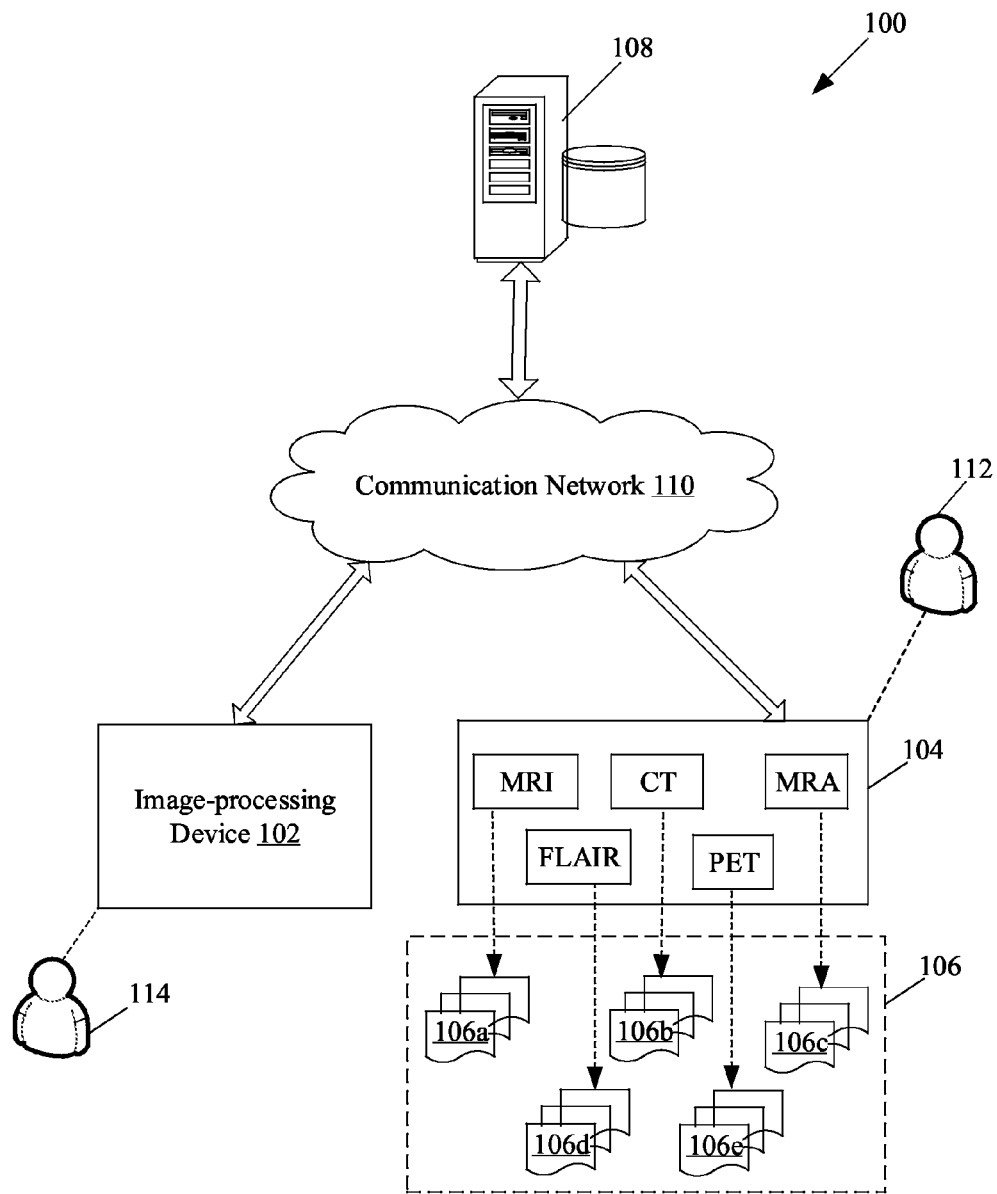
FIG. 1 is a block diagram that illustrates a network environment to process multimodal images, in accordance with an embodiment of the disclosure.

The following described implementations may be found in the disclosed system and method to process multimodal images. Exemplary aspects of the disclosure may include generation of a structured point cloud by an image-processing device that represents edge points of an anatomical portion. The structured point cloud may be generated based on shrink-wrapping of an unstructured point cloud to a boundary of the anatomical portion. Diffusion filtering may be performed to dilate edge points that correspond to the structured point cloud to mutually connect the edge points on the structured point cloud. A mask may be created for the anatomical portion from the diffusion filtering.

In accordance with an embodiment, the anatomical portion may correspond to a skull portion, a knee cap portion, or other anatomical portions of a subject. The multimodal images may be received from a plurality of medical imaging devices. The received multimodal images may correspond to different sets of unregistered images associated with the anatomical portion of a subject. The plurality of multimodal images may correspond to X-ray computed tomography (CT), magnetic resonance imaging (MRI), magnetic resonance angiography (MRA), fluid-attenuated inversion recovery (FLAIR), and/or positron emission tomography (PET).

In accordance with an embodiment, volumetric edges of the anatomical portion of the subject may be detected by use of a first set of images. The first set of images may be obtained from at least one of the plurality of medical imaging devices that captures the anatomical portion from different points-of-view.

In accordance with an embodiment, one or more surface layers of the anatomical portion may be computed based on registration of the multimodal images. Mutual information may be computed for structures that overlap in the associated multimodal images, the anatomical portion of the subject. The amount of co-occurrence information may be measured for the overlapped structures that contain smooth gradients in the computed one or more surface layers to compute the mutual information. In accordance with an embodiment, the computed mutual information may be optimized by use of a gradient descent technique, known in the art.

In accordance with an embodiment, the computed mutual information may be modified by application of higher spatial weights around one of the computed one or more surface layers in comparison to other surface layers. The one surface layer may correspond to a skull surface. In accordance with an embodiment, skull structure information associated with the one surface layer may be identified from MRI data, based on the created mask.

In accordance with an embodiment, a plurality of multi-dimensional graphical views of the anatomical portion may be generated. The generated plurality of multi-dimensional graphical views may comprise a first set of views that further comprises the identified skull structure information associated with the one surface layer. The generated plurality of multi-dimensional graphical views may further comprise a second set of views that further comprises the identified skull structure information, together with underlying tissue information, which corresponds to the other surface layers. In accordance with an embodiment, the generated plurality of multi-dimensional graphical views may correspond to one or more perspectives of a three-dimensional (3D) view of the anatomical portion.

In accordance with an exemplary aspect of the disclosure, a structured point cloud that represents edge points of a skull portion may be generated. The structured point cloud for the skull portion may be generated based on shrink-wrapping of an unstructured point cloud to a boundary of the skull portion. Mutual information may be computed for a plurality of structures that overlap in the multimodal images associated with the skull portion. The boundary of the skull portion corresponds to one of the plurality of overlapped structures. The computed mutual information may be computed by application of higher spatial weights around a skull surface layer of the skull portion in comparison to other underlying brain surface layers of the skull portion. The skull surface layer and the underlying brain surface layers of the skull portion may be computed based on alignment of bone structure of the skull portion in the multimodal images.

FIG. 1 is a block diagram that illustrates a network environment to process multimodal images, in accordance with an embodiment of the disclosure. With reference to FIG. 1, there is shown an exemplary network environment 100. The network environment 100 may include an image-processing device 102, a plurality of medical imaging devices 104, multimodal images 106, a server 108, a communication network 110, one or more users, such as a human subject 112, and a medical assistant 114. The multimodal images 106 may include different sets of unregistered images 106a to 106e of an anatomical portion of a subject, such as the human subject 112. The image-processing device 102 may be communicatively coupled to the plurality of medical imaging devices 104 and the server 108, via the communication network 110.

The image-processing device 102 may comprise suitable logic, circuitry, interfaces, and/or code that may be configured to process the multimodal images 106, obtained from the plurality of medical-imaging devices 104. In accordance with an embodiment, the image-processing device 102 may be configured to display a plurality of multi-dimensional, such as two-dimensional (2D) or three-dimensional (3D), graphical views of the anatomical portion. The plurality of multi-dimensional graphical views of the anatomical portion, such as the skull portion, may be a result of processing of the multimodal images 106. In accordance with an embodiment, such display may occur in real-time, or near real-time, while a surgical or diagnostic procedure is performed on the anatomical region of the subject, such as the human subject 112. In accordance with an embodiment, such display may also occur in preoperative, intraoperative, or postoperative states of the subject, as per user-defined configuration settings. Examples of the image-processing device 102 may include, but are not limited to, a user terminal or an electronic device associated with a computer-assisted surgical system or a robot-assisted surgical system, a medical device, an electronic surgical instrument, a tablet computer, a laptop, a display device, and/or a computing device.

The plurality of medical-imaging devices 104 may correspond to diagnostic equipment used to create visual representations of internal structures or anatomical portions of a subject, such as the human subject 112. The visual representations from the diagnostic equipment may be used for clinical analysis and medical intervention. Examples of the plurality of medical-imaging devices 104 may include, but are not limited to, an X-ray computed tomography (CT) scanner, a magnetic resonance imaging (MRI) scanner, a magnetic resonance angiography (MRA) scanner, a fluid-attenuated inversion recovery (FLAIR) based scanner, and/or a positron emission tomography (PET) scanner.

The multimodal images 106 correspond to images and/or data obtained from multimodality, such as the plurality of medical imaging devices 104. For instance, the multimodal images 106 may include the different sets of unregistered images 106a to 106e of the anatomical portion, such as a skull portion, of the subject. The multimodal images 106 may correspond to a first set of images 106a or data obtained from the MRI modality. The multimodal images 106 may further correspond to a second set of images 106b, obtained from the CT-based medical-imaging technique. Similarly, the multimodal images 106 may also include a third set of images 106c obtained from MRA-based medical imaging technique, a fourth set of images 106d obtained from the FLAIR-based medical imaging technique, and finally, a fifth set of images 106e obtained from the PET-based medical imaging technique.

The server 108 may comprise suitable logic, circuitry, interfaces, and/or code that may be configured to receive and centrally store the multimodal images 106 and associated data obtained from the plurality of medical-imaging devices 104. In accordance with an embodiment, the server 108 may be configured to provide the stored multimodal images 106 to the image-processing device 102. In accordance with an embodiment, the image-processing device 102 may directly receive the multimodal images 106 from the plurality of medical-imaging devices 104. In accordance with an embodiment, both the server 108 and the image-processing device 102 may be part of a computer-assisted surgical system. In accordance with an embodiment, the server 108 may be implemented as a plurality of cloud-based resources by use of several technologies that are well known to those skilled in the art. Examples of the server 108 may include, but are not limited to, a database server, a file server, an application server, a web server, and/or their combination.

The communication network 110 may include a medium through which the image-processing device 102, the plurality of medical-imaging devices 104, and/or the server 108 may communicate with each other. The communication network 110 may be a wired or wireless communication network. Examples of the communication network 110 may include, but are not limited to, a Local Area Network (LAN), a Wireless Local Area Network (WLAN), a cloud network, a Long Term Evolution (LTE) network, a plain old telephone service (POTS), a Metropolitan Area Network (MAN), and/or the Internet. Various devices in the network environment 100 may be configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the image-processing device 102 may be configured to receive the multimodal images 106 from the plurality of medical-imaging devices 104. The received multimodal images 106 may correspond to the different sets of unregistered images 106a to 106e associated with an anatomical portion of a subject, such as the human subject 112. In accordance with an embodiment, the anatomical portion may be a skull portion of the human subject 112. In accordance with an embodiment, the anatomical portion may be a knee cap part, or other anatomical portions of the human subject 112. A person with ordinary skill in the art will understand that the scope of the disclosure is not limited to implementation of the disclosed system and method to process the multimodal images 106 of the anatomical portion of the human subject 112, as shown. In accordance with an embodiment, the multimodal images 106 of the anatomical portion of an animal subject may be processed as required, without deviation from the scope of the disclosure.

The multimodal images 106 may exhibit structural, resolution, and/or clinical usage differences, in the different sets of unregistered images 106a to 106e. For example, structural differences may be observed when a comparison is performed among the first set of images 106a, the second set of images 106b, and the third set of images 106c. The first set of images 106a (obtained from the MRI), may provide tissue and bone structure information for an anatomical portion, such as the skull portion. The second set of images 106b (obtained from the CT-based medical-imaging technique), may provide bone structure information of the anatomical portion rather than tissue information. The third set of images 106c may also comprise vessel information of the same anatomical portion, such as brain surface structures of the same subject.

In another example, the resolution of the fifth set of images 106e (obtained from PET-based medical-imaging techniques), may be low as compared to other sets of images, such as the fourth set of images 106d (obtained from the FLAIR). The first set of images 106a (obtained from the MRI), and/or the second set of images 106b (obtained from the CT-based medical-imaging technique), may have higher resolution as compared to the resolution of the fifth set of images 106e. Thus, resolution differences may also be observed in the multimodal images 106. Further, the first set of images 106a (obtained from the MRI), may be used for the purposes of planning a surgery. On the contrary, the fourth set of images 106d (obtained from the FLAIR) and the fifth set of images 106e (obtained from PET) are usually used for diagnostic purposes. Thus, clinical usage differences may also be observed in the multimodal images 106.

In accordance with an embodiment, to register the multimodal images 106 from different modalities, such as the CT and MRI, the multimodal images 106 must include overlapped content. The structural, resolution, and/or clinical usage differences, in the different sets of unregistered images 106a to 106e of the multimodal images 106 may make registration a difficult task. In accordance with an embodiment, the image-processing device 102 may be configured to locate common information content across the multimodal images 106. At least a reference point, which is invariable for the same subject in two or more sets of images obtained from different modalities, may be identified and utilized for registration of the multimodal images 106. For example, for registration, the image-processing device 102 may be configured to align the bone structure of a skull portion in the multimodal images 106 (which may comprise data obtained from the CT scan and the MRI of the same subject). The common information content may be identified and isolated across different image modalities as the spatial alignment of the bone structure of the skull portion, which is invariable for the same subject. Focus on a specific structure, such as the bone structure of the skull portion of the anatomy, may allow non-overlapping segments of the image content to be excluded, which increases the accuracy of the registration.

In accordance with an embodiment, the image-processing device 102 may be configured to detect volumetric edges of the anatomical portion of the subject, such as the human subject 112. The volumetric edges of the anatomical portion may be detected by use of data obtained from at least one of the plurality of medical-imaging devices 104, which captures the anatomical portion from different points-of-view. In accordance with an embodiment, the data may be a first set of images 106a of the anatomical portion, such as the skull portion, obtained from the MRI.

The image-processing device 102 may be configured to register the multimodal images, such as the different sets of images 106a to 106e, based on the identified reference point. In accordance with an embodiment, the image-processing device 102 may be configured to compute one or more surface layers of the anatomical portion based on registration of the multimodal images. For example, the image-processing device 102 may compute the skull surface layer and underlying brain surface layers of the skull portion, based on the alignment of the bone structure of the skull portion in the multimodal images 106.

In accordance with an embodiment, the image-processing device 102 may be configured to compute mutual information for overlapping structures in the multimodal images 106, which may be associated with the anatomical portion of the subject. Non-overlapped structures may be considered as outliers. An amount of co-occurrence information may be measured for the overlapped structures with smooth gradients in the computed one or more surface layers. The result may be used to compute the mutual information. The mutual information for the overlapping structures in the multimodal images 106 may be computed by use of the following mathematical expressions:

$$I(A, B) = \sum_a \sum_b P_{AB}(a, b) \log \frac{P_{AB}(a, b)}{P_A(a) P_B(b)} \quad (1)$$

$$I(A, B) = H(A) + H(B) - H(A, B) \quad (2)$$

$$H(x) = -\sum_i p(x_i) \log p(x_i) \quad (3)$$

In accordance with the expression (1), "I(A, B)" corresponds to the mutual information of two discrete random variables A and B associated with the multimodal images 106. "$P_{AB}(a, b)$" may be the joint probability distribution function of random variables A and B. "$P_A(a)$" may be the marginal probability distribution function of the random variable A and "$P_B(b)$" may be the marginal probability distribution function of the other random variable B. In accordance with expression (2), "H(A)" and "H(B)" corresponds to marginal entropies of the respective discrete random variables A and B of the associated multimodal images 106, and "H(A,B)" corresponds to joint entropy of the discrete random variables A and B. In accordance with the expression (3), Shannon entropy, "H(x)" corresponds to entropy of the discrete random variable, "x", with possible values $\{x_1, x_2, \ldots, x_n\}$ for a finite sample associated with a certain number of multimodal images 106, where "$p(x_i)$" is the probability of information or character number, "i", in the discrete random variable "x". The Shannon entropy may measure the uncertainty in the discrete random variable "x".

In accordance with an embodiment, the image-processing device 102 may be configured to modify the computed mutual information. The computed mutual information may be modified by application of higher spatial weights around one surface layer, such as skull surface layer, of the computed one or more surface layers in comparison to other surface layers.

In accordance with an embodiment, the image-processing device 102 may be configured to generate a structured point cloud (such as a skull point cloud), which represents edge points (such as edge points on the skull surface) of the anatomical portion. The structured point cloud may be generated based on shrink-wrapping of an unstructured point cloud to a boundary of the anatomical portion (described in FIG. 3C in an example). In accordance with an embodiment, the boundary may correspond to the detected volumetric edges of the anatomical portion, such as the skull portion, of the subject.

Figure 3A:
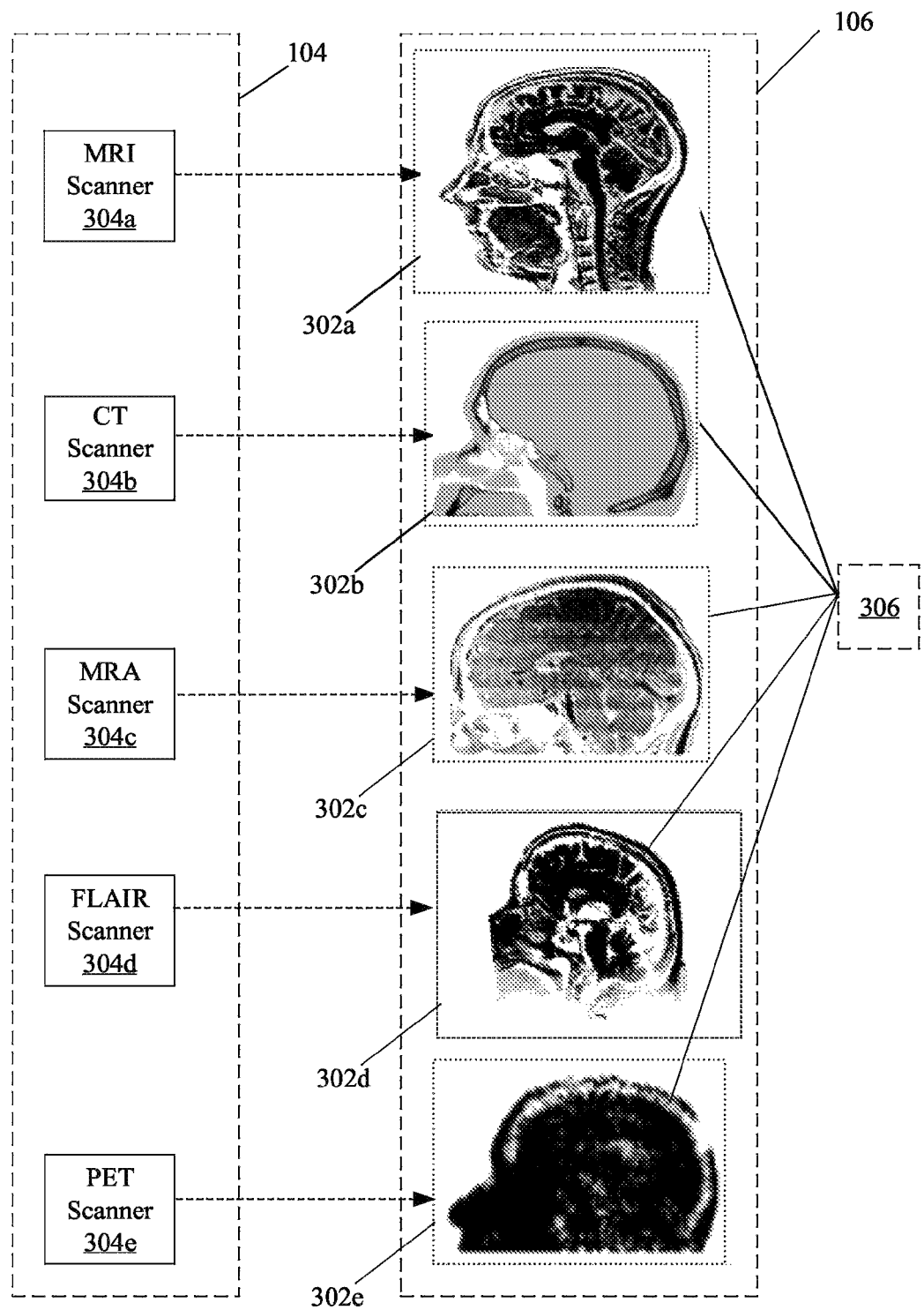
FIGS. 3A to 3F, collectively, illustrate an exemplary scenario for implementation of the system and method to process multimodal images, in accordance with an embodiment of the disclosure.
Figure 3B:
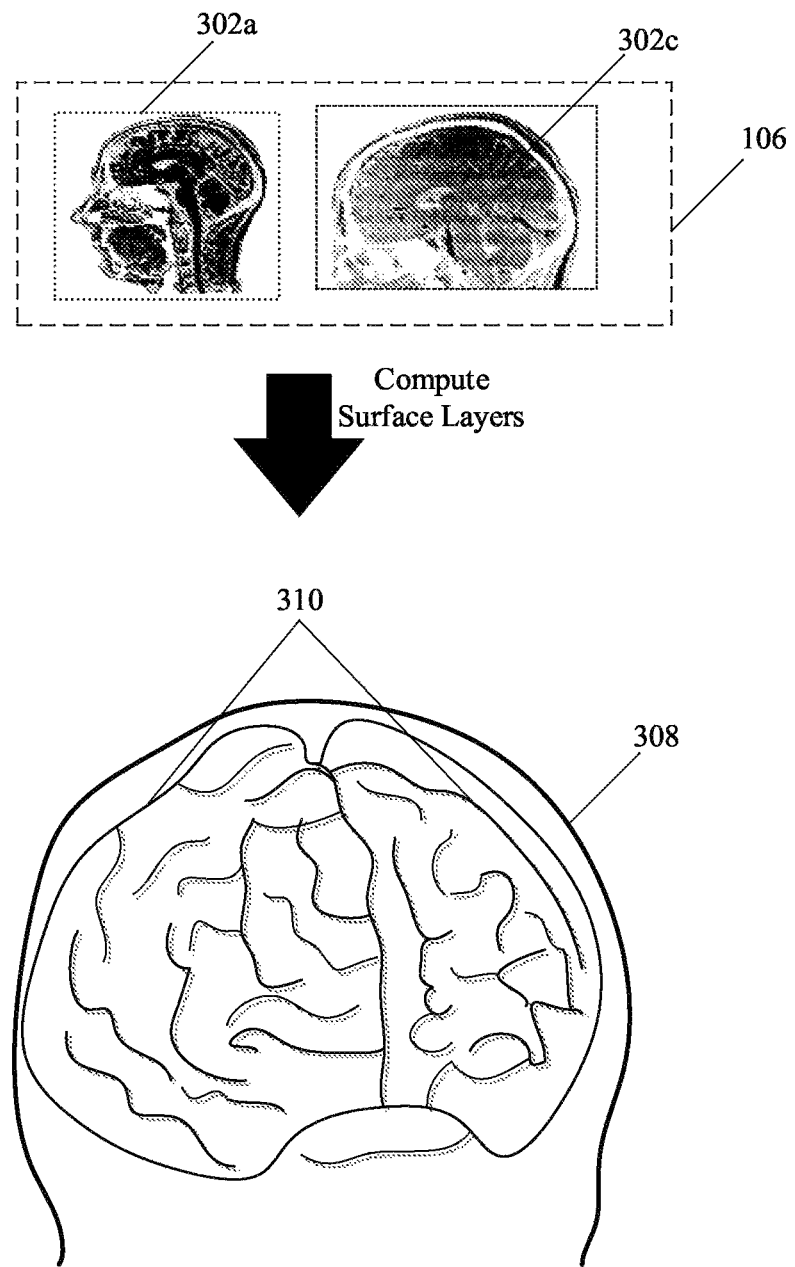
Figure 3C:
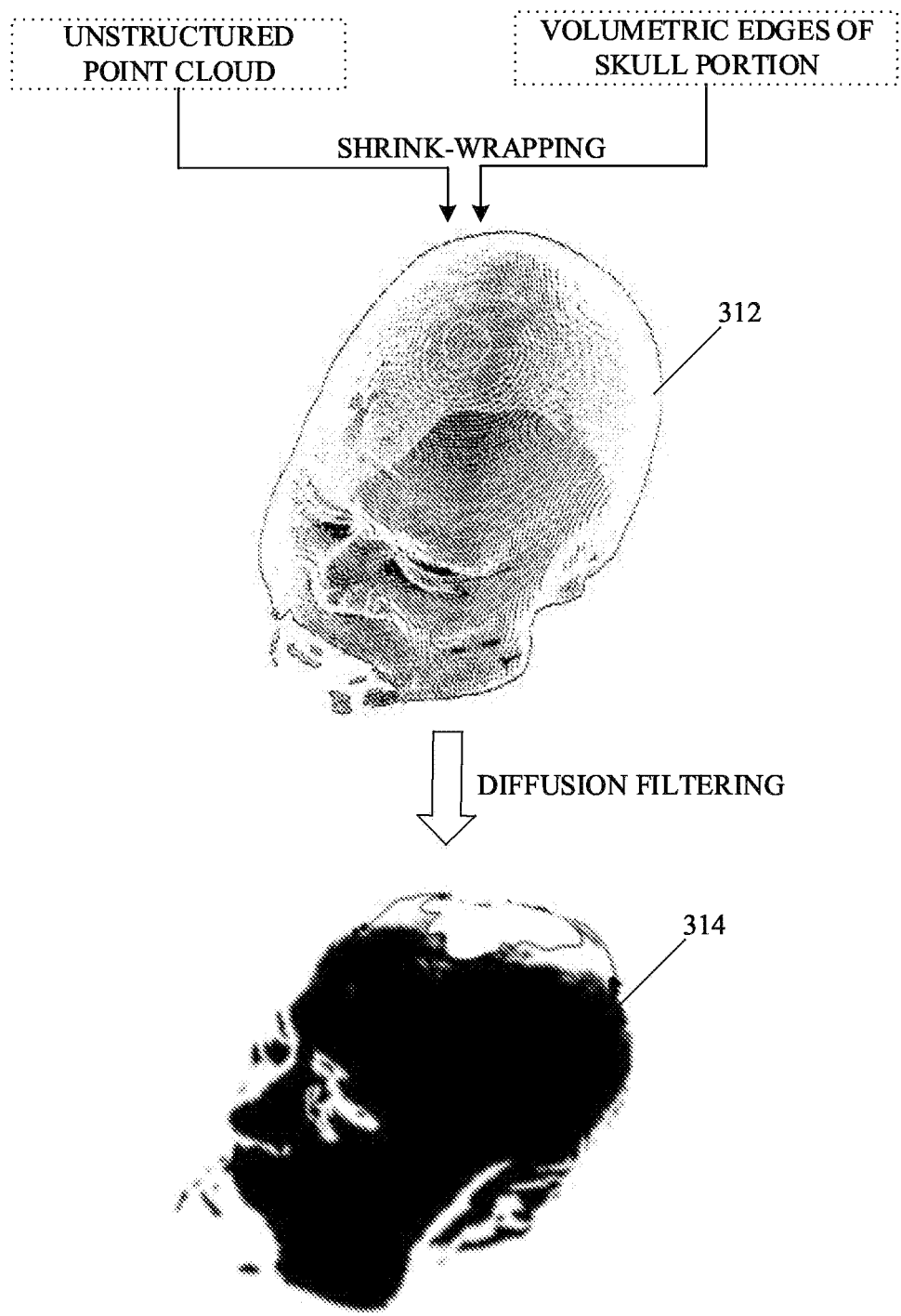
Figure 3D:
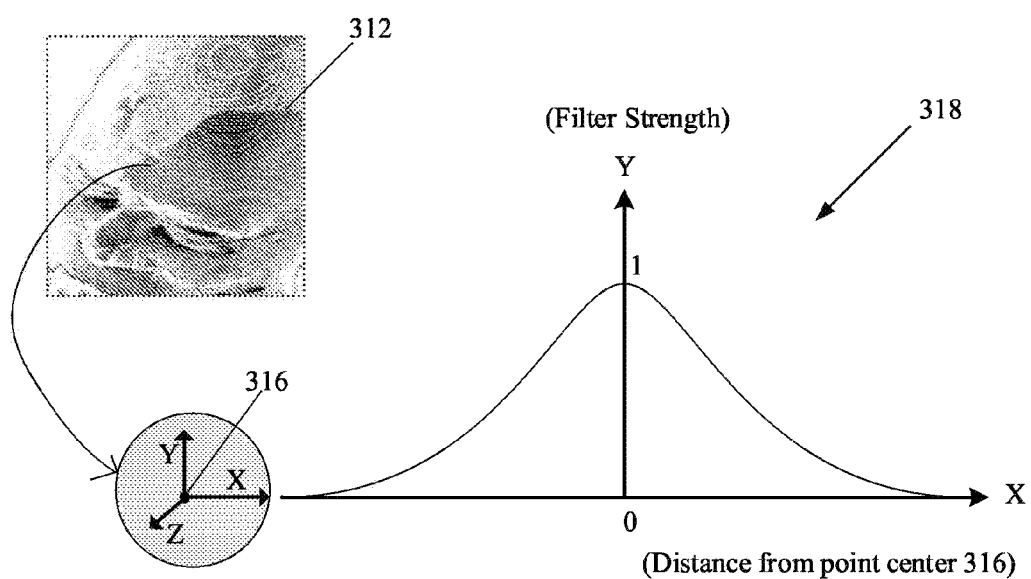

In accordance with an embodiment, the image-processing device 102 may be configured to perform diffusion filtering to dilate edge points of the structured point cloud (further described in FIG. 3D). The dilation of the edge points of the structured point cloud may be performed to mutually connect the edge points in the structured point cloud. The image-processing device 102 may be configured to create a mask for the anatomical portion based on the diffusion filtering. The mask may be a continuous surface that may make possible optimum usage of various data, such as MRI data of the anatomical portion, to achieve accurate fusion of information obtained from the multimodality sources. The creation of the mask from the diffusion filtering may be an efficient process. The creation of the mask from the diffusion filtering may be less computationally intensive operation as compared to creation of a polygonal or triangular mesh structure from the structured point cloud to obtain a continuous surface. Further, the polygonal or triangular mesh structure may require higher storage space than the created mask.

In accordance with an embodiment, the image-processing device 102 may be configured to further identify skull structure information associated with the one surface layer (such as the skull surface layer), from MRI data, based on the created mask. The image-processing device 102 may be configured to apply the identified skull structure information from MRI data and/or the other computed and modified mutual information on and/or within the created mask to generate enhanced visual representations.

The image-processing device 102 may be configured to generate a plurality of multi-dimensional graphical views, such as a 3D view, of the anatomical portion as required, which may be used to plan or perform a surgery on the anatomical portion or for enhanced diagnosis of an ailment in the anatomical portion. Based on the operative state (such as preoperative, intraoperative, or postoperative), and/or received user input, different interactive graphical views of the anatomical portion may be generated. In accordance with an embodiment, user-configurations may be pre-defined or changed in real time or near real time, by the medical assistant 114, based on instructions received from a registered medical practitioner. The user configurations may be used to generate different pluralities of multi-dimensional graphical views of the anatomical portion as required. Thus, the generated plurality of multi-dimensional graphical views may be user-controlled and interactive and may be changed and visualized, as medically required.

In accordance with an embodiment, the generated plurality of multi-dimensional graphical views may provide enhanced views of the anatomical portion from one or more perspectives. The generated plurality of multi-dimensional graphical views may comprise a first set of views that includes the identified skull structure information associated with the one surface layer (such as the skull surface layer). The generated plurality of multi-dimensional graphical views may also include a second set of views that includes the identified skull structure information together with underlying tissue information, which correspond to the other surface layers, such as brain surface structures when the anatomical portion is the skull portion. The brain surface structures may be gray matter, white matter, ventricular structures, vessel structure, the thalamus, and/or other tissue structures.

Figure 2:
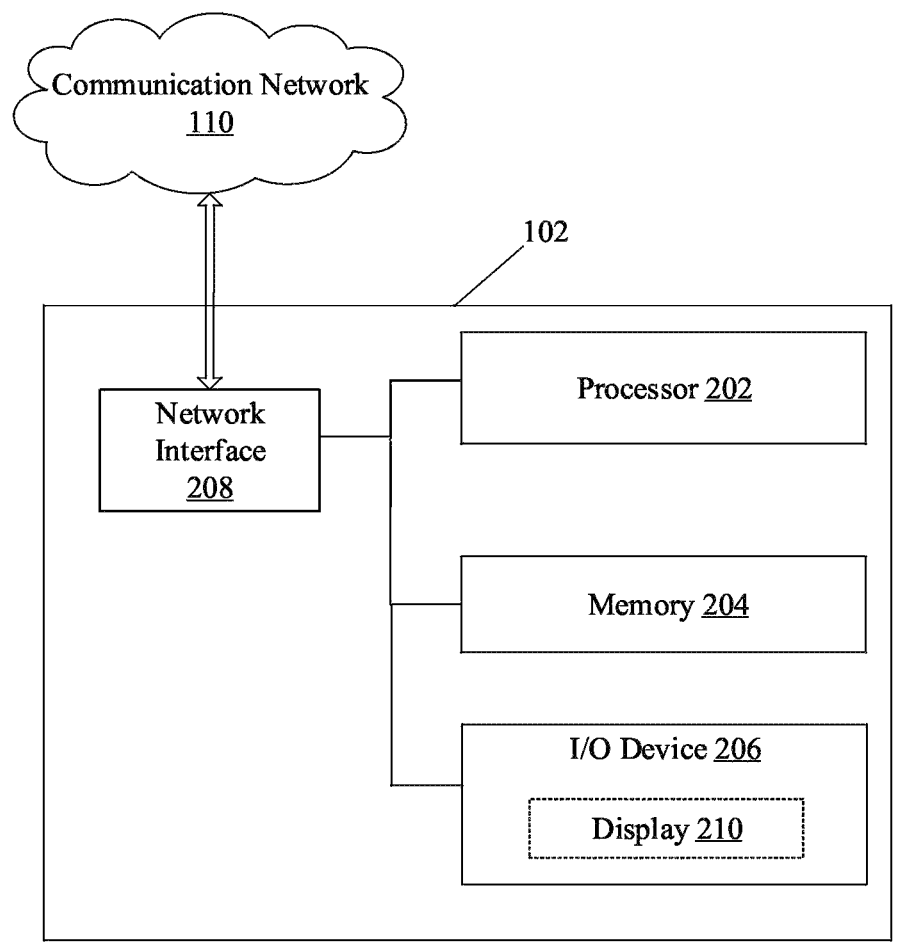
FIG. 2 illustrates a block diagram of an exemplary image-processing device to process multimodal images, in accordance with an embodiment of the disclosure.

FIG. 2 illustrates a block diagram of an exemplary image-processing device to process multimodal images, in accordance with an embodiment of the disclosure. FIG. 2 is explained in conjunction with elements from FIG. 1. With reference to FIG. 2, there is shown the image-processing device 102. The image-processing device 102 may comprise one or more processors, such as a processor 202, a memory 204, one or more input/output (I/O) devices, such as an I/O device 206, and a network interface 208. The I/O device 206 may include a display 210.

The processor 202 may be communicatively coupled to the I/O device 206 the memory 204, and the network interface 208. The network interface 208 may communicate with one or more servers, such as the server 108, and/or the plurality of medical-imaging devices 104, via the communication network 110 under the control of the processor 202.

The processor 202 may comprise suitable logic, circuitry, interfaces, and/or code that may be configured to execute a set of instructions stored in the memory 204. The processor 202 may be further configured to process the multimodal images 106 received from the plurality of medical-imaging devices 104 or a central device, such as the server 108. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be configured to store a machine code and/or a set of instructions executable by the processor 202. The memory 204 may be configured to store information from one or more user profiles associated with physiological data or medical history of the subject (such as the human subject 112). The memory 204 may be further configured to store user-defined configuration settings to generate the plurality of multi-dimensional graphical views of the anatomical portion. The plurality of multi-dimensional graphical views of the anatomical portion may be displayed on a user interface (UI) rendered on the display 210. The UI may be a 3D viewer or a 2D viewer. The memory 204 may be further configured to store operating systems and associated applications. Examples of implementation of the memory 204 may include, but are not limited to, Random Access Memory (RAM), Read Only Memory (ROM), Electrically Erasable Programmable Read- Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from and provide an output to a user, such as the medical assistant 114. The I/O device 206 may include various input and output devices that may be configured to facilitate communication between the image-processing device 102 and the user (such as the medical assistant 114). Examples of the input devices may include, but are not limited to, a touch screen, a camera, a keyboard, a mouse, a joystick, a microphone, a motion sensor, a light sensor, and/or a docking station. Examples of the output devices may include, but are not limited to, the display 210, a projector screen, and/or a speaker.

The network interface 208 may comprise suitable logic, circuitry, interfaces, and/or code that may be configured to communicate with one or more servers, such as the server 108, and/or the plurality of medical-imaging devices 104, via the communication network 110 (as shown in FIG. 1). The network interface 208 may implement known technologies to support wired or wireless communication of the image-processing device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 208 may communicate via wired or wireless communication with the communication network 110. The wireless communication may use one or more of the communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, LTE, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The display 210 may be realized through several known technologies, such as Cathode Ray Tube (CRT) based display, Liquid Crystal Display (LCD), Light Emitting Diode (LED) based display, Organic LED display technology, Retina display technology, and/or the like. In accordance with an embodiment, the display 210 may be capable of receiving input from the user (such as the medical assistant 114). In such a scenario, the display 210 may be a touch screen that enables the user to provide the input. The touch screen may correspond to at least one of a resistive touch screen, a capacitive touch screen, or a thermal touch screen. In accordance with an embodiment, the display 210 may receive the input through a virtual keypad, a stylus, a gesture-based input, and/or a touch-based input. In such a case, the input device may be integrated within the display 210. In accordance with an embodiment, the image-processing device 102 may include a secondary input device apart from the display 210 that may be a touch screen based display.

In operation, the processor 202 may be configured to receive the multimodal images 106 from the plurality of medical-imaging devices 104, by use of the network interface 208. The received multimodal images 106 may correspond to different sets of unregistered images 106a to 106e, associated with the anatomical portion of the subject, such as the human subject 112. The operations performed by the processor 202 have been further described in the FIGS. 3A to 3F, by an example of the skull portion of the human subject 112, as the anatomical portion. Notwithstanding, the anatomical portion may also be a knee cap part, or other anatomical portions of the subject of which the multimodal images 106 may be obtained from the plurality of the medical-imaging devices 104, without limiting the scope of the disclosure.

FIGS. 3A to 3F, collectively, illustrate an exemplary scenario for implementation of the disclosed system and method to process multimodal images, in accordance with an embodiment of the disclosure. FIG. 3A illustrates receipt of multimodal images for a skull portion of a subject in the exemplary scenario for implementation of the system and method, in accordance with an embodiment of the disclosure. FIG. 3A is explained in conjunction with FIG. 1 and FIG. 2. With reference to FIG. 3A, there are shown medical images 302a to 302e of the same skull portion of the same subject received from the plurality of medical-imaging devices 104, such as an MRI scanner 304a, a CT scanner 304b, an MRA scanner 304c, a FLAIR scanner 304d, and a PET scanner 304e, respectively. There is further shown a bone structure 306 of the skull portion of the human subject 112, common to the medical images 302a to 302e.

In accordance with the exemplary scenario, the medical images 302a to 302e of the skull portion may correspond to the multimodal images 106. The medical image 302a may be an output of the MRI scanner 304a of the skull portion of the human subject 112. A number of medical images may be obtained from the MRI scanner 304a from different points-of-view that may be referred to as a first set of medical images. The first set of medical images may correspond to first set of images 106a (FIG. 1). As the medical image 302a represents a view of the skull portion from one point-of-view, the first set of medical images may represent a captured view of the skull portion from different points-of-view. Similarly, the medical image 302b may be obtained from the CT scanner 304b. The medical image 302c may be obtained from the MRA scanner 304c. The medical image 302d may be obtained from the FLAIR scanner 304d, and finally the medical image 302e may be obtained from the PET scanner 304e. The output, such as the medical images 302a to 302e, received from multimodal sources, as described above, may be stored at a central device, such as the server 108. In such a case, the processor 202 may receive the medical images 302a to 302e from the server 108. In accordance with an embodiment, the medical images 302a to 302e may be stored at the memory 204.

In accordance with an embodiment, the processor 202 may be configured to process the received medical images 302a to 302e. The processor 202 may be configured to align the bone structure 306 of the same skull portion of the same human subject 112 for the registration of the unregistered medical images 302a to 302e. As the bone structure 306 is invariable for the same human subject 112, it may be used as a reference point to preliminarily register the medical images 302a to 302e. The processor 202 may be configured to identify and isolate the bone structure 306 of the skull portion across the received medical images 302a to 302e. This makes possible exclusion of the non-overlapped part or outliers of the bone structure 306 in the medical images 302a to 302e.

In accordance with an embodiment, the processor 202 may be configured to detect volumetric edges of the skull portion of the human subject 112, by use of the first set of medical images captured by the MRI scanner 304a from different points-of-view (also referred to as MRI slices). In other words, different medical images or data captured from various perspectives for the same skull portion from a single modality, such as the MRI scanner 304a, may also be used to detect the volumetric edges of the skull portion based on the alignment of the bone structure 306 as the reference point. In accordance with an embodiment, the volumetric edges of the skull portion may represent boundary of the skull portion in a 3D space.

FIG. 3B illustrates surface layers of the skull portion computed based on the registration of the multimodal images in the exemplary scenario for implementation of the system and method, in accordance with an embodiment of the disclosure. FIG. 3B is explained in conjunction with FIGS. 1, 2, and 3A. With reference to FIG. 3B, there is shown a skull surface layer 308 and a brain surface layer 310, computed based on the alignment of the bone structure 306 of the skull portion in the medical images 302a to 302e. The skull surface layer 308 may represent the skull surface of the skull portion. The brain surface layer 310 may include one or more brain surface structures, such as a cerebrum surface structure, cerebellum surface structure, vessel structures, other brain tissue information, or brain ventricular structures.

In accordance with an embodiment, the processor 202 may be configured to compute one or more surface layers of the skull portion based on the registration. The processor 202 may compute the skull surface layer 308, based on the alignment of the bone structure 306 of the skull portion in the medical images 302a to 302e (such as the multimodal images). In accordance with an embodiment, the processor 202 may compute both the skull surface layer 308 and the underlying brain surface layer 310 of the skull portion, based on the alignment of the bone structure of the skull portion in the medical images 302a to 302e. In accordance with an embodiment, the first set of medical images, such as MRI data, or data obtained from one or two modality instead of all of the plurality of medical-imaging devices 104, may be used as required for computation of the one or more surface layers of the skull portion.

In accordance with an embodiment, the processor 202 may be configured to compute mutual information for structures that overlap in the medical images 302a to 302e, associated with the skull portion of the human subject 112. The mutual information may be computed, in accordance with the mathematical expressions (1), (2), and/or (3), as described in FIG. 1. The amount of co-occurrence information may be measured for the overlapped structures with smooth gradients in the computed one or more surface layers (such as the skull surface layer 308 and the brain surface layer 310), to compute the mutual information.

In accordance with an embodiment, the processor 202 may be configured to modify the computed mutual information by application of higher spatial weights around one surface layer, such as a skull surface, of the computed one or more surface layers in comparison to other surface layers. In other words, the reliable structures, such as the skull surface layer 308, may be weighted more than the comparatively less reliable structures, such as vessel structures of the brain surface layer 310. The application of higher spatial weights around the reliable structures increases the accuracy for computation of the mutual information across the medical images 302a to 302e.

FIG. 3C illustrates creation of a mask for a skull portion in the exemplary scenario for implementation of the system and method, in accordance with an embodiment of the disclosure. FIG. 3C is explained in conjunction with FIGS. 1, 2, 3A, and 3B. With reference to FIG. 3C, there is shown a skull point cloud 312 and a mask 314. The skull point cloud 312 corresponds to the structured point cloud of the anatomical portion. In accordance with an embodiment, the skull point cloud 312 may represent edge points of the detected volumetric edges of the skull portion, such as the boundary of skull surface, as point cloud. The mask 314 may be a continuous structure generated from the skull point cloud 312. The mask 314 may represent the skull surface layer 308 of the skull portion. The mask 314 may also be representative of a current skull state, such as an open state of skull during a surgery or a closed state of skull in the preoperative or postoperative phase of a surgery.

In accordance with an embodiment, the processor 202 may be configured to generate the structured point cloud, such as the skull point cloud 312, which represents edge points on the skull surface. The structured point cloud may be generated based on shrink-wrapping of an unstructured point cloud to a boundary of the skull portion. In accordance with an embodiment, the boundary of the skull portion may correspond to the detected volumetric edges of the skull portion of the human subject 112.

In accordance with an embodiment, the unstructured point cloud may correspond to the point cloud obtained from 3D scanners or other point cloud generators known in the art, such as a laser range scanner (LRS). In accordance with an embodiment, the unstructured point cloud may correspond to the point cloud obtained by use of stereoscopic images from stereo vision, or based on computer vision that may capture the skull portion from a plurality of points-of-view. In accordance with an embodiment, the unstructured point cloud may correspond to point cloud created from the 2D medical images 302a to 302e (multimodal images of the skull portion).

In accordance with an embodiment, the processor 202 may be configured to perform diffusion filtering to dilate edge points of the skull point cloud 312 to mutually connect the edge points in the skull point cloud 312. The processor 202 may be configured to create the mask 314 for the skull portion based on the diffusion filtering.

FIG. 3D illustrates diffusion filtering of edge points of an exemplary skull point cloud in the exemplary scenario for implementation of the system and method, in accordance with an embodiment of the disclosure. FIG. 3D is explained in conjunction with FIGS. 1, 2, 3A, 3B, and 3C. With reference to FIG. 3D, there is shown a skull point cloud 312, a point center 316, and a graph 318.

The point center 316 corresponds to a centroid of a point of the skull point cloud 312, as shown. The graph 318 corresponds to a diffusion filter that represents the filter strength on the Y-axis and distance from the point center 316 on the X-axis, as shown. The diffusion filter domain may be a 3D sphere with the same depicted profile in all three directions (such as X-, Y-, and Z-axis directions), as illustrated by the arrows.

In accordance with an embodiment, the processor 202 may be configured to control the thickness of the skull surface layer 308. Based on the calculation of total time taken for the decay of the diffusion filter, and subsequent configuration of the total time, the thickness of the skull surface layer 308 may be controlled. In other words, the skull thickness may be controlled based on how fast the diffusion filter decays. In accordance with an embodiment, the diffusion filter may be centered at each point of the skull point cloud 312 and convolved with the skull point cloud 312. Accordingly, each point of the skull point cloud 312 may dilate to mutually connect with each other. Such dilation and mutual connection may occur in all the three directions, such as in the X-, Y-, and Z-direction, to create the mask 314 of the skull portion.

In accordance with an embodiment, the processor 202 may be configured to identify skull structure information associated with the skull surface layer 308, from the MRI data based on the created mask 314. In accordance with an embodiment, the processor 202 may be configured to identify tissue information of the brain surface layer 310, based on the computed mutual information, in accordance with the mathematical expressions (1), (2), and/or (3), as described in FIG. 1.

Figure 3E:
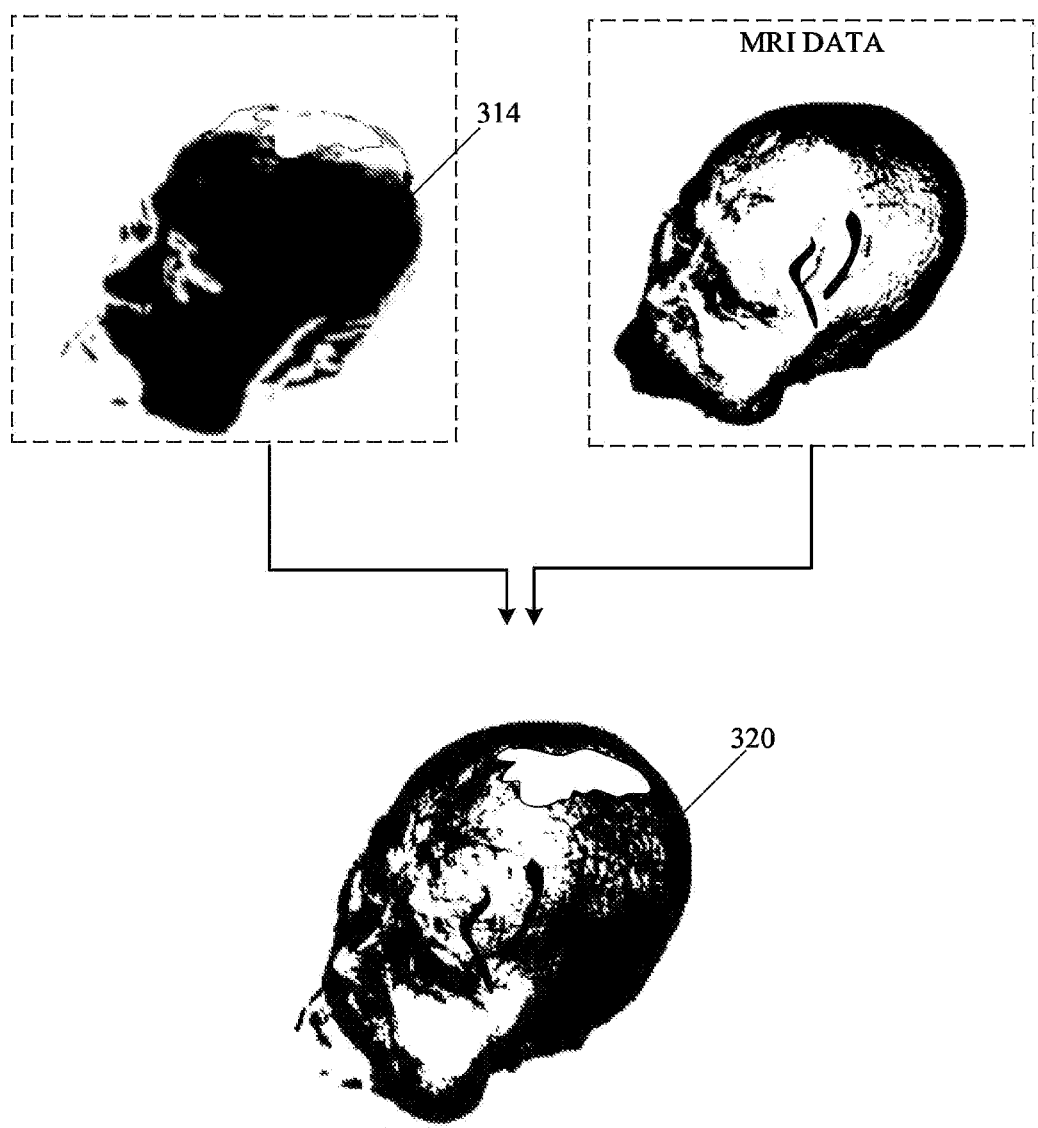

FIG. 3E illustrates generation of an enhanced view of the skull portion in the exemplary scenario for implementation of the system and method, in accordance with an embodiment of the disclosure. FIG. 3E is explained in conjunction with FIGS. 1, 2, 3A, 3B, 3C, and 3D. With reference to FIG. 3E, there is shown an enhanced view 320 of the skull portion.

The processor 202 may be configured to utilize the MRI data of the skull portion and the created mask 314, to generate the enhanced view 320 of the skull portion. In accordance with an embodiment, the MRI data of the skull portion may be applied on the created mask 314 for the generation of the enhanced view 320 of the skull portion. The MRI data may be the identified skull structure information associated with the skull portion. In accordance with an embodiment, the modified mutual information associated with the skull surface layer 308 and other computed mutual information associated with the skull portion may be further utilized and applied on the created mask 314, to generate the enhanced view 320 of the skull portion.

Figure 3F:
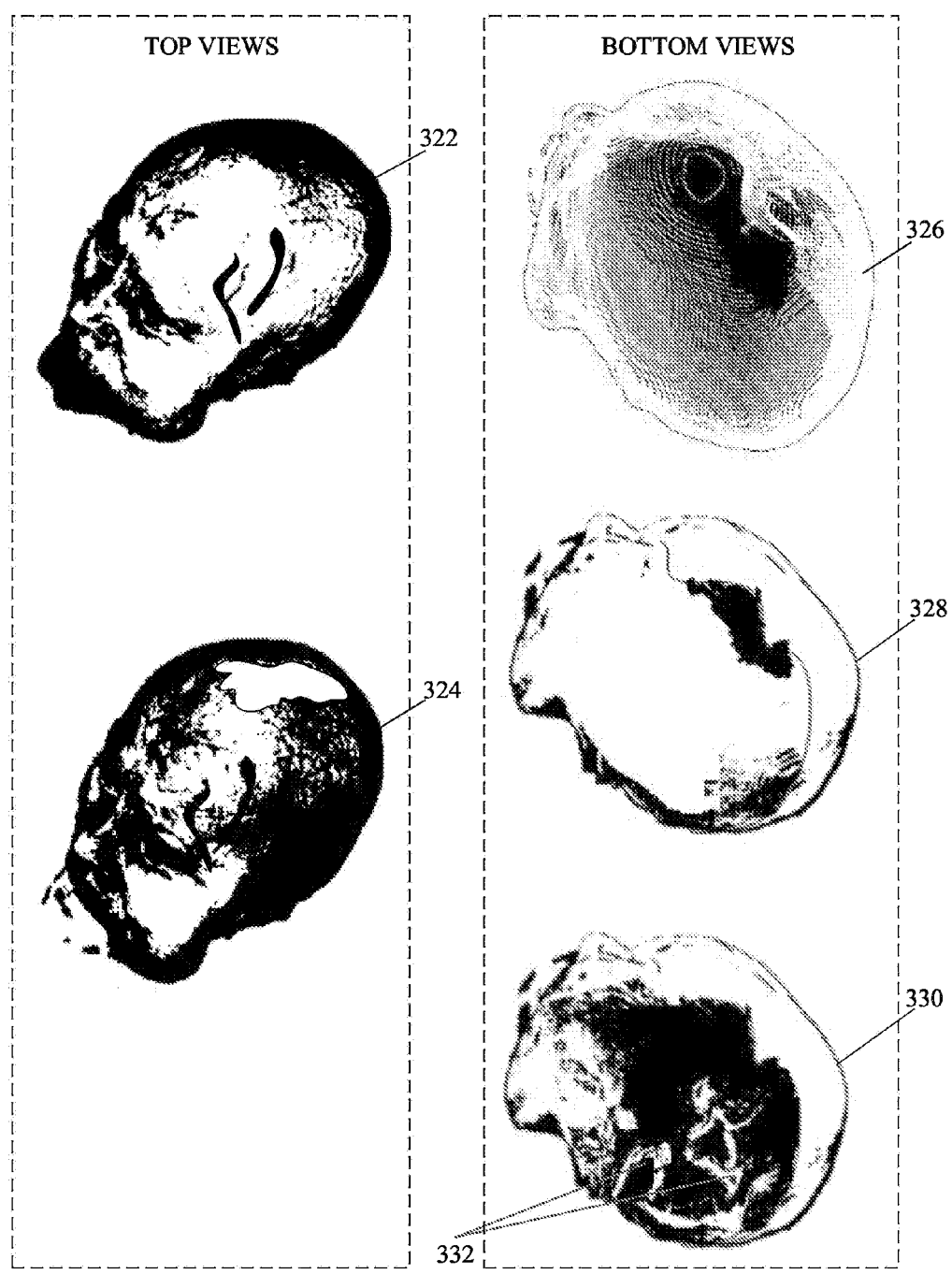

FIG. 3F illustrates different views of a skull portion in the exemplary scenario for implementation of the system and method, in accordance with an embodiment of the disclosure. FIG. 3F is explained in conjunction with FIGS. 1, 2, 3A, 3B, 3C, 3D, and 3E. With reference to FIG. 3F, there is shown a first top view 322 of the skull portion in the preoperative state and a second top view 324 of the skull portion in the intraoperative stage. There is further shown a first bottom view 326 of the skull point cloud 312, a second bottom view 328 of the skull portion in the intraoperative state, and a third bottom view 330 of the skull portion in the preoperative state together with brain tissue information 332.

The processor 202 may be configured to generate a plurality of multi-dimensional graphical views, such as the views 322 to 332, of the skull portion. The generated plurality of multi-dimensional graphical views may provide enhanced views of the skull portion from one or more perspectives. The generated plurality of multi-dimensional graphical views may comprise a first set of views that includes the identified skull structure information associated with the skull surface layer 308. The first top view 322, the second top view 324, the first bottom view 326, and the second bottom view 328, all correspond to the first set of views that includes the identified skull structure information associated with the skull surface layer 308.

The generated plurality of multi-dimensional graphical views may also include a second set of views that includes the identified skull structure information, together with underlying tissue information that corresponds to the other surface layers, such as brain surface structures of the brain surface layer 310. The third bottom view 330 of the skull portion in the preoperative state, together with brain tissue information 332, corresponds to the second set of views that includes the identified skull structure information together with underlying tissue information.

The processor 202 may be configured to control display of the generated plurality of multi-dimensional graphical views, such as a 2D view or a 3D view, of the skull portion on the UI. The displayed plurality of multi-dimensional graphical views may be interactive and user-controlled, based on input received from the I/O device 206. The user input may be received by use of the UI rendered on the display 210, of the image-processing device 102. The display of the plurality of multi-dimensional graphical views may be changed and updated in response to the received user input, such as input provided by the medical assistant 114. Such enhanced visualization of the multi-dimensional graphical views of the skull portion on the UI may be utilized by users, such as a physician, for diagnostic purposes and/or for provision of real-time or near real-time assistance in a surgery.

Figure 4:
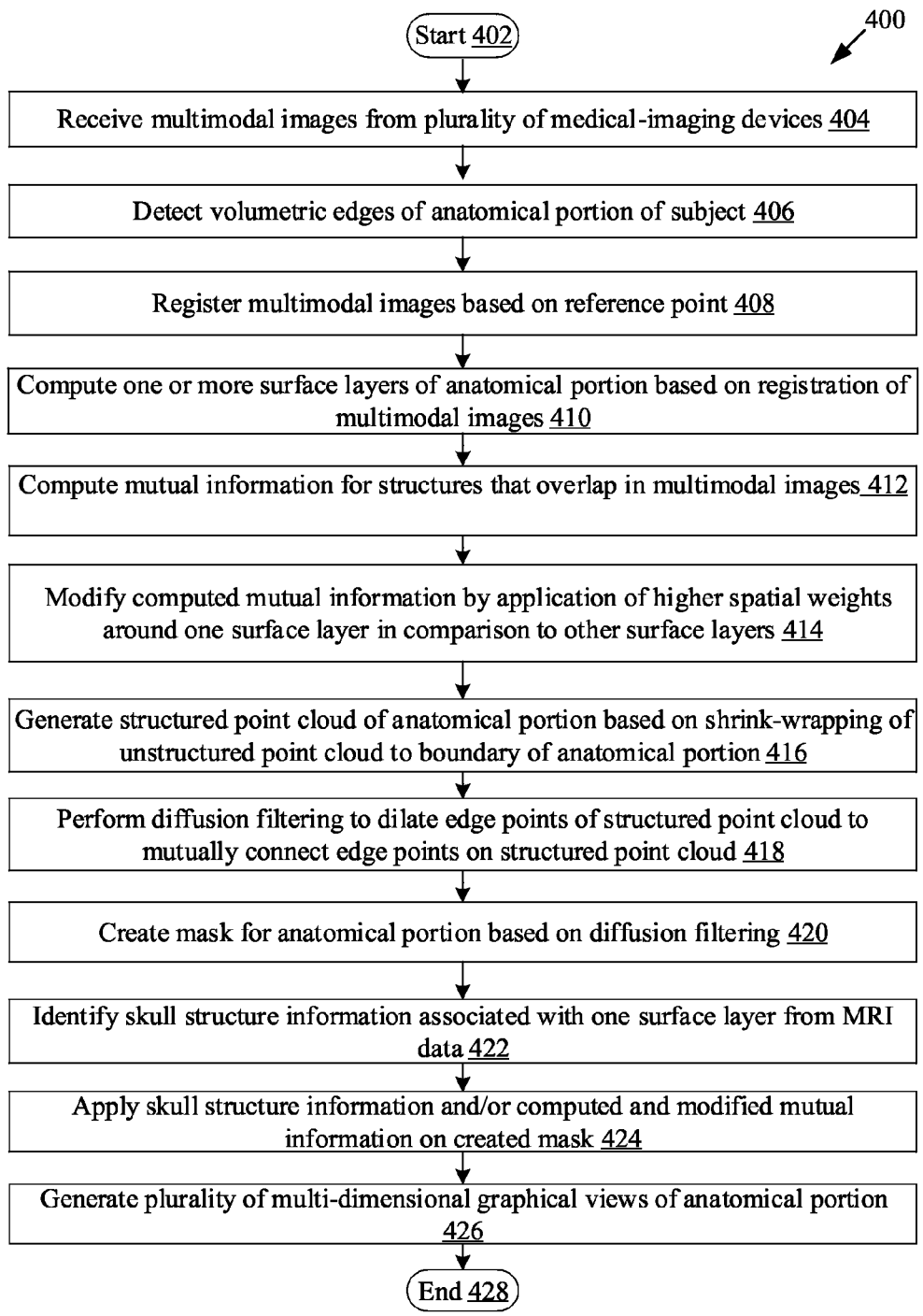
FIG. 4 illustrates a flow chart for implementation of an exemplary method to process multimodal images, in accordance with an embodiment of the disclosure.

FIG. 4 illustrates a flow chart for implementation of an exemplary method to process multimodal images, in accordance with an embodiment of the disclosure. With reference to FIG. 4, there is shown a flow chart 400. The flow chart 400 is described in conjunction with FIGS. 1, 2, and 3A to 3F. The method, in accordance with the flowchart 400, may be implemented in the image-processing device 102. The method starts at step 402 and proceeds to step 404.

At step 404, multimodal images 106 from the plurality of medical-imaging devices 104 may be received. The received multimodal images 106 may correspond to different sets of unregistered images 106a to 106e, associated with an anatomical portion of a subject, such as the human subject 112. The anatomical portion may be a skull portion, a knee cap part, or other anatomical portions of the subject. The subject may be the human subject 112 or an animal subject (not shown). At step 406, volumetric edges of the anatomical portion of the subject may be detected by use of a first set of images. The first set of images from the different sets of unregistered images may be obtained from at least one of the plurality of medical-imaging devices 104, such as the MRI scanner, which captures the anatomical portion from different points-of-view.

At step 408, the multimodal images 106 may be registered based on a reference point. For example, for registration, the image-processing device 102 may be configured to align the bone structure 306 of the skull portion in the multimodal images 106, such as data obtained from the CT scan and the MRI. At step 410, one or more surface layers of the anatomical portion may be computed based on registration of the multimodal images 106, such as the medical images 302a to 302e. For example, the skull surface layer 308 and underlying brain surface layer 310 of the skull portion may be computed based on the alignment of the bone structure 306 of the skull portion in the medical images 302a to 302e.

At step 412, mutual information may be computed for structures that overlap in the multimodal images 106, associated with the anatomical portion of the subject (such as the human subject 112). The mutual information may be computed, in accordance with the mathematical expressions (1), (2), and/or (3), as described in FIG. 1. The amount of co-occurrence information may be measured for the overlapped structures with smooth gradients in the computed one or more surface layers to compute the mutual information. At step 414, the computed mutual information may be modified by an application of higher spatial weights around one surface layer, such as skull surface layer 308, of the computed one or more surface layers in comparison to other surface layers, such as the brain surface layer 310.

At step 416, a structured point cloud, such as the skull point cloud 312 (which represents edge points, such as edge points on the skull surface), of the anatomical portion, may be generated. The structured point cloud may be generated based on shrink-wrapping of an unstructured point cloud to a boundary of the anatomical portion. At step 418, diffusion filtering may be performed to dilate edge points of the structured point cloud to mutually connect the edge points on the structured point cloud.

At step 420, a mask, such as the mask 314, may be created for the anatomical portion based on the diffusion filtering. At step 422, skull structure information associated with the one surface layer, such as the skull surface layer 308, may be identified from MRI data, based on the created mask.

At step 424, skull structure information and/or modified and computed mutual information may be applied on the created mask. At step 426, a plurality of multi-dimensional graphical views, such as a 3D view, of the anatomical portion may be generated. The generated plurality of multi-dimensional graphical views may provide enhanced views of the anatomical portion from one or more perspectives. The generated plurality of multi-dimensional graphical views may comprise a first set of views that includes the identified skull structure information associated with the one surface layer, such as the skull surface. The generated plurality of multi-dimensional graphical views may also include a second set of views that includes the identified skull structure information, together with underlying tissue information that corresponds to the other surface layers, such as brain surface structures. Examples of the generated plurality of multi-dimensional graphical views of the skull portion has been shown and described in FIG. 3F. Control passes to end step 428.

In accordance with an embodiment of the disclosure, the system to process multimodal images may comprise the image-processing device 102 (FIG. 1). The image-processing device 102 may comprise one or more circuits, such as the processor 202 (FIG. 2). The processor 202 may be configured to generate a structured point cloud that represents edge points of an anatomical portion based on shrink-wrapping of an unstructured point cloud to a boundary of the anatomical portion. The processor 202 may be further configured to perform diffusion filtering to dilate edge points that corresponds to the structured point cloud to mutually connect the edge points on the structured point cloud. The processor 202 may be further configured to create a mask for the anatomical portion based on the diffusion filtering.

Various embodiments of the disclosure may provide a non-transitory computer readable medium and/or storage medium, and/or a non-transitory machine readable medium and/or storage medium with a machine code stored thereon, and/or a set of instructions executable by a machine and/or a computer to process multimodal images. The set of instructions in the image-processing device 102 may cause the machine and/or computer to perform the steps that comprise generation of a structured point cloud that represents edge points of an anatomical portion. The structured point cloud may be generated based on shrink-wrapping of an unstructured point cloud to a boundary of the anatomical portion. Diffusion filtering may be performed to dilate edge points that correspond to the structured point cloud to mutually connect the edge points on the structured point cloud. A mask may be created for the anatomical portion based on the diffusion filtering.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A system for processing multimodal images, said system comprising:
    one or more circuits in an image-processing device configured to:
        generate a structured point cloud that represents edge points of an anatomical portion based on shrink-wrapping of an unstructured point cloud to a boundary of said anatomical portion;
        diffusion filter to dilate said edge points corresponding to said structured point cloud to mutually connect said edge points on said structured point cloud;
        create a mask for said anatomical portion based on said diffusion filter; and
        detect volumetric edges of said anatomical portion of a subject based on a first set of images that are captured from different points-of-view.

2. The system according to claim 1, wherein said anatomical portion corresponds to one of a skull portion, a knee cap part, or other anatomical portions of said subject.

3. The system according to claim 1, wherein said one or more circuits are further configured to receive said multimodal images from a plurality of medical-imaging devices,
    wherein said multimodal images correspond to different sets of unregistered images associated with said anatomical portion of said subject, and
    wherein said multimodal images correspond to a plurality of X-ray computed tomography (CT), magnetic resonance imaging (MRI), magnetic resonance angiography (MRA), fluid-attenuated inversion recovery (FLAIR), or positron emission tomography (PET).

4. The system according to claim 3, wherein said first set of images are obtained from at least one of said plurality of medical-imaging devices that captures said anatomical portion from different points-of-view.

5. The system according to claim 1, wherein said one or more circuits are further configured to compute at least one surface layer of said anatomical portion based on registration of said multimodal images.

6. The system according to claim 5,
wherein said one or more circuits are further configured to compute mutual information for overlapping structures in said multimodal images associated with said anatomical portion of said subject,
wherein an amount of co-occurrence information is measured for overlapped structures with smooth gradients in said computed said at least one surface layer to compute said mutual information.

7. The system according to claim 6, wherein said one or more circuits are further configured to modify said mutual information based on application of higher spatial weights around a first surface layer of said at least one surface layer in comparison to a second surface layer of said at least one surface layer, wherein said first surface layer corresponds to a skull surface.

8. The system according to claim 7, wherein said one or more circuits are further configured to identify skull structure information associated with said first surface layer from magnetic resonance imaging (MRI) data based on said mask.

9. The system according to claim 8,
wherein said one or more circuits are further configured to generate a plurality of multi-dimensional graphical views of the anatomical portion,
wherein said plurality of multi-dimensional graphical views comprises at least one of a first set of views comprising said skull structure information associated with said first surface layer and a second set of views comprising said identified skull structure information together with underlying tissue information or vessel information that corresponds to said second surface layer.

10. The system according to claim 9, wherein said generated plurality of multi-dimensional graphical views corresponds to a three dimensional view of said anatomical portion from at least one perspective.

11. A system for processing multimodal images, said system comprising:
one or more circuits in an image-processing device configured to:
generate a structured point cloud that represents edge points of a skull portion based on shrink-wrapping of an unstructured point cloud to a boundary of said skull portion;
compute mutual information for a plurality of overlapping structures in said multimodal images associated with said skull portion,
wherein said boundary of said skull portion corresponds to one of said plurality of overlapping structures; and
modify said mutual information based on application of higher spatial weights around a skull surface layer of said skull portion in comparison to other underlying brain surface layers of said skull portion.

12. The system according to claim 11, wherein said one or more circuits are further configured to compute said skull surface layer and underlying brain surface layers of said skull portion based on alignment of bone structure of said skull portion in said multimodal images.

13. A method for processing multimodal images, said method comprising:
generating, by one or more circuits in an image-processing device, a structured point cloud that represents edge points of an anatomical portion based on shrink-wrapping of an unstructured point cloud to a boundary of said anatomical portion;
diffusion filtering, by said one or more circuits, to dilate said edge points corresponding to said structured point cloud to mutually connect said edge points on said structured point cloud;
creating, by said one or more circuits, a mask for said anatomical portion based on said diffusion filtering; and
detecting volumetric edges of said anatomical portion of a subject based on a first set of images that are captured from different points-of-view.

14. The method according to claim 13, wherein said anatomical portion corresponds to one of skull, knee cap, or other anatomical portions of said subject.

15. The method according to claim 13, further comprising receiving, by said one or more circuits, said multimodal images from a plurality of medical-imaging devices,
wherein said multimodal images correspond to different sets of unregistered images associated with said anatomical portion of said subject, and
wherein said multimodal images correspond to a plurality of X-ray computed tomography (CT), magnetic resonance imaging (MRI), magnetic resonance angiography (MRA), fluid-attenuated inversion recovery (FLAIR), or positron emission tomography (PET).

16. The method according to claim 15, wherein said first set of images are obtained from at least one of said plurality of medical-imaging devices that captures said anatomical portion from different points-of-view.

17. The method according to claim 13, further comprising computing, by said one or more circuits, at least one surface layer of said anatomical portion based on registration of said multimodal images.

18. The method according to claim 17, further comprising computing, by said one or more circuits, mutual information for overlapping structures in received said multimodal images associated with said anatomical portion of said subject,
wherein an amount of co-occurrence information is measured for overlapped structures with smooth gradients in said computed said one surface layer to compute said mutual information.

19. The method according to claim 18, further comprising modifying, by said one or more circuits, said mutual information by applying higher spatial weights around a first surface layer of said at least one surface layer in comparison to a second surface layer of said at least one surface layer, wherein said first surface layer corresponds to a skull surface.

20. The method according to claim 19, further comprising identifying, by said one or more circuits, skull structure information associated with said first surface layer from magnetic resonance imaging (MRI) data based on said mask.

21. The method according to claim 20, further comprising generating, by said one or more circuits, a plurality of multi-dimensional graphical views of said anatomical portion,
wherein said generated plurality of multi-dimensional graphical views comprises at least one a first set of views comprising said identified skull structure information associated with said first surface layer and a second set of views comprising said identified skull structure information together with underlying tissue information or vessel information that corresponds to said second surface layer.

* * * * *